Feb. 24, 1970  G. W. MELCHER  3,496,692
INSULATED PANEL ASSEMBLY
Filed Sept. 18, 1967  4 Sheets-Sheet 1
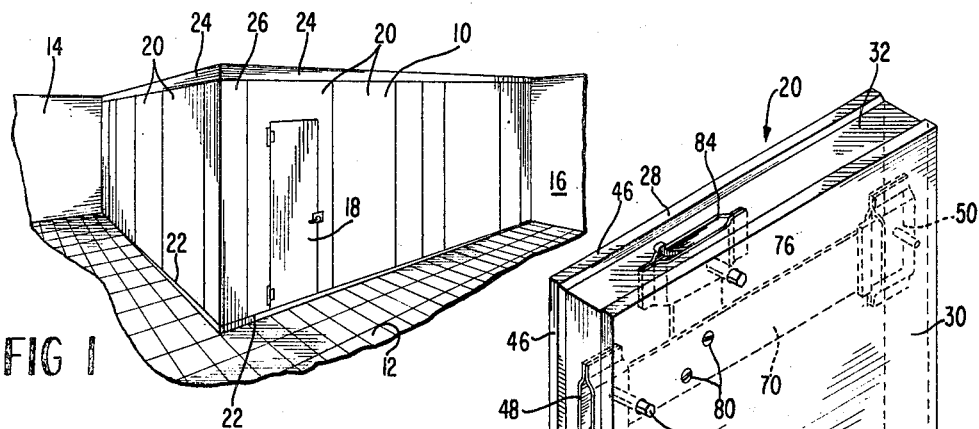
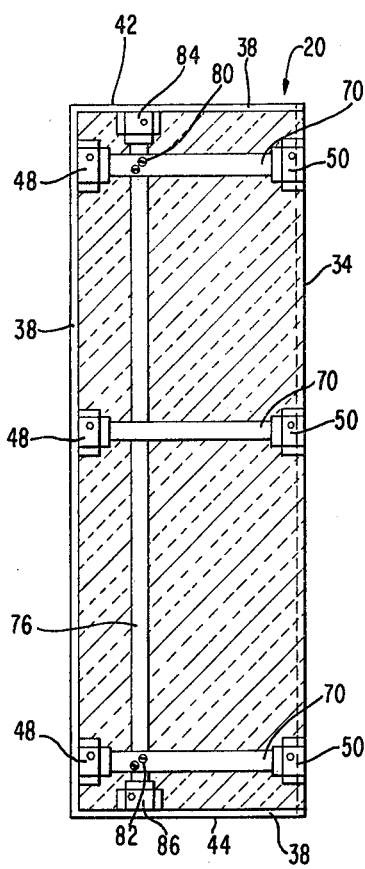
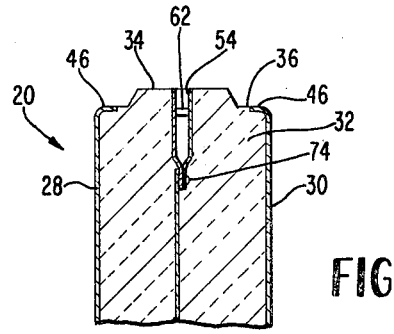
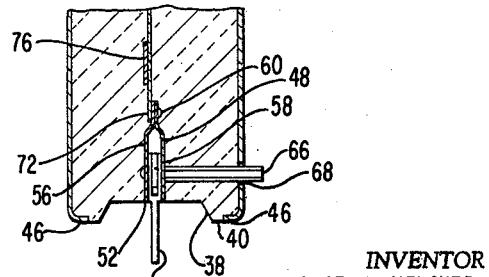
FIG 1
FIG 2
FIG 3
FIG 4
INVENTOR
GEORGE W. MELCHER
BY *Le Blanc & Shur*
ATTORNEYS

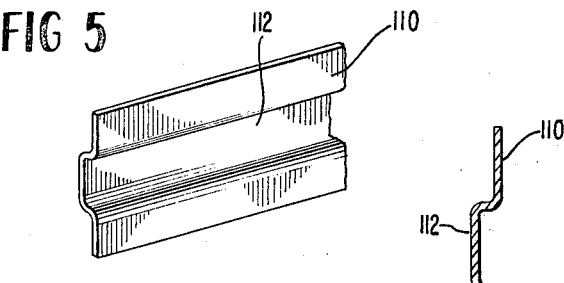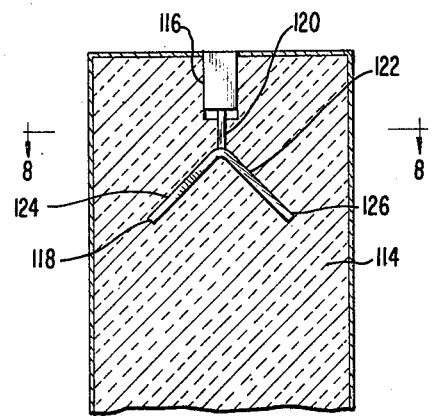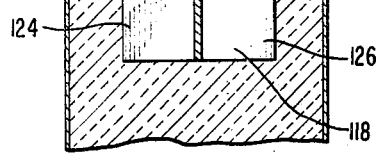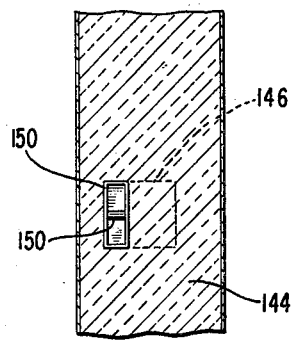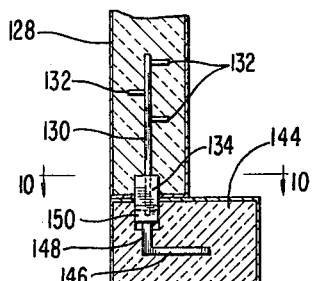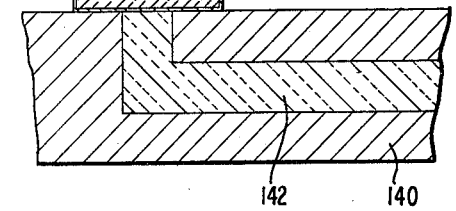

Feb. 24, 1970  G. W. MELCHER  3,496,692
INSULATED PANEL ASSEMBLY
Filed Sept. 18, 1967  4 Sheets-Sheet 3
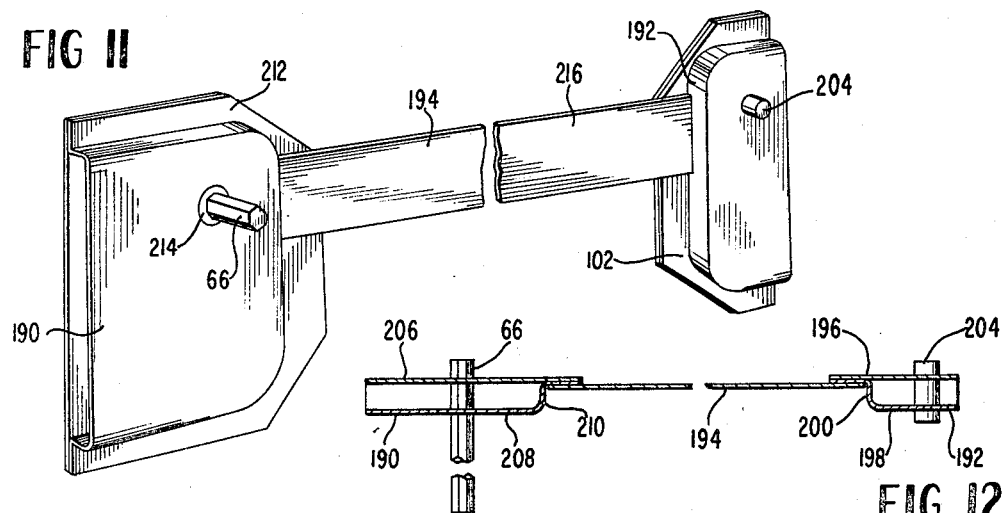
FIG 11
FIG 12
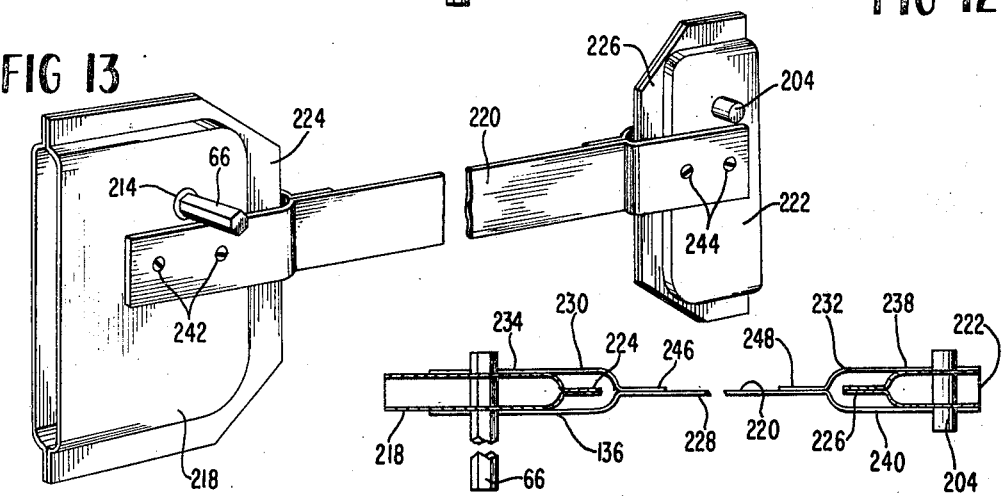
FIG 13
FIG 14
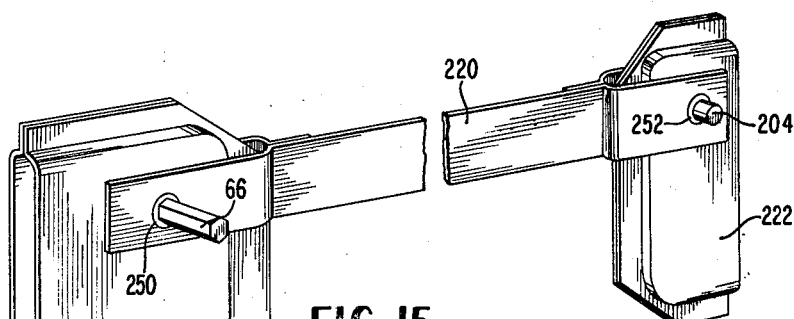
FIG 15
INVENTOR
GEORGE W. MELCHER
BY 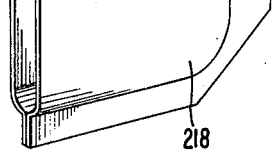
ATTORNEYS Feb. 24, 1970 G. W. MELCHER 3,496,692
INSULATED PANEL ASSEMBLY
Filed Sept. 18, 1967 4 Sheets-Sheet 4
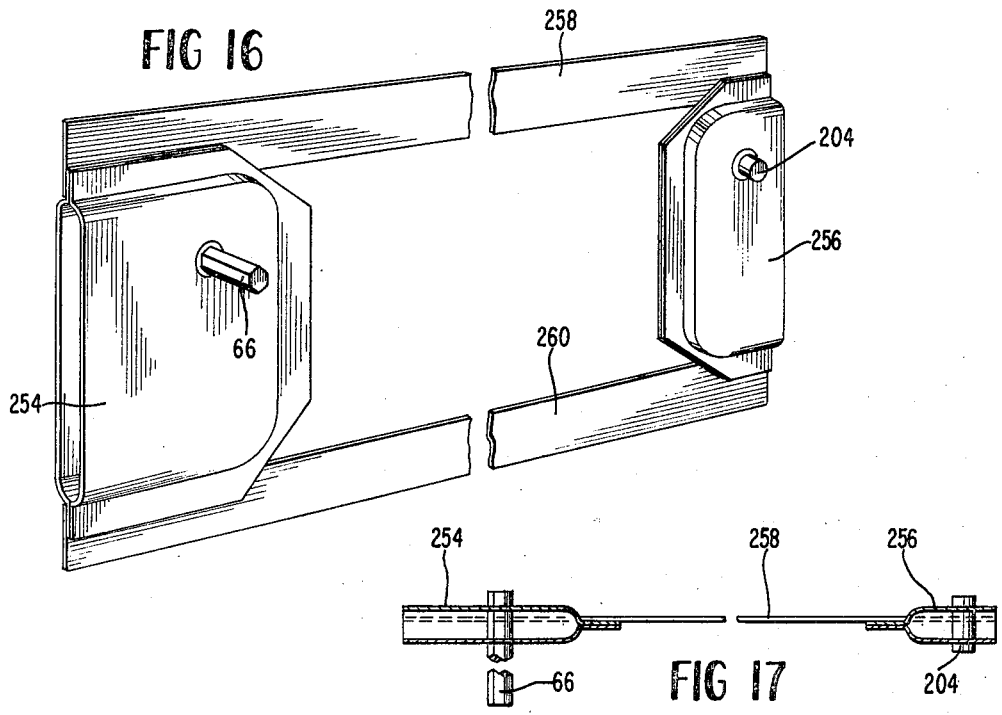
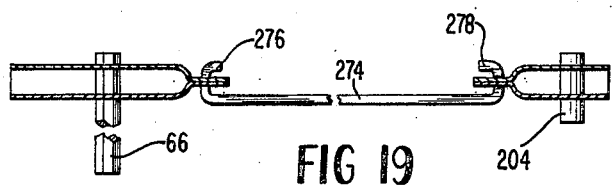
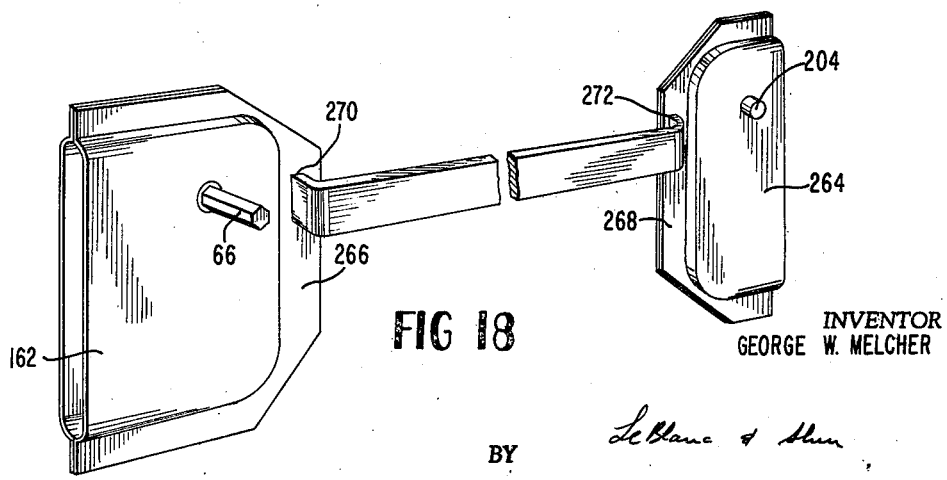
INVENTOR
GEORGE W. MELCHER
BY *LeBlanc & Shur*
ATTORNEYS United States Patent Office 3,496,692
Patented Feb. 24, 1970

3,496,692
INSULATED PANEL ASSEMBLY
George W. Melcher, Bally, Pa., assignor to Bally Case and Cooler, Inc., Bally, Pa., a corporation of Delaware
Continuation-in-part of application Ser. No. 560,306, June 24, 1966. This application Sept. 18, 1967, Ser. No. 668,484
Int. Cl. E04c 1/10
U.S. Cl. 52—583                                2 Claims

ABSTRACT OF THE DISCLOSURE

Disclosed is a novel insulated panel assembly for walk in refrigerators and the like and particularly an improved supporting and locking structure for individual panels of the assembly. Embedded in an intermediate insulating layer of low tensile strength such as rigid cellular urethane foam and spaced from the metal walls of the panel are a pair of quick release locking cups joined by a reinforcing metal strap, also spaced from the panel walls.

---

DISCLOSURE OF INVENTION

The present application is a continuation-in-part of copending application Ser. No. 560,306, filed June 24, 1966, now Patent No. 3,353,314, which is in turn a continuation-in-part of the then copending application Ser. No. 131,570, filed Aug. 15, 1961, now abandoned.

This invention relates to prefabricated insulated panels and to an assembly of rectangular prefabricated heat-insulating panels and particularly to a metallic cup lock and supporting strap structure for permitting rapid and secure assembly of insulated panels to form a refrigerated or similar compartment.

In the early days of mechanical refrigeration, cooling and freezing compartments, particularly of the walk-in type, were built-in and often made of cork insulation usually covered with plaster, wood, or other materials. In recent years, the requirements for improved strength, sanitation, life, and economy, have resulted in all-metal clad sectional type refrigeration compartments formed from prefabricated panels so as to make possible a wide variety of sizes and shapes. Walk-in refrigerators and coolers are now used throughout the food, chemical, and medical industries for refrigerating a wide variety of products. Modern refrigerating compartments of walk-in size have achieved the important goal of complete sanitation by eliminating the possibility of penetration by insects and rodents. The metal panels also prevent the accumulation of foods and juices which often can cause offensive odors.

Materials such as galvanized steel, aluminum, stainless steel, and others are available for large sized compartments. Lower costs are achieved through the use of sectional construction involving mass production techniques with on-site assembly. The sections can be made in a variety of widths, lengths, and heights so that the assembly of proper sections can be accommodated to fit almost every user's requirement.

Locking devices are provided for tightly assembling the preformed panels for forming a large refrigerated compartment. In addition to the very tight sealing required to avoid heat leakage at all joints, it is essential that the locking device not only be of simple construction and easy to actuate, but also should provide no straight-through heat conducting path joining the inner and outer walls of the panel so that heat is not readily conducted and lost through the locking mechanism. At the same time, some provision must be made for supporting the locking units in the insulating panel which is usually filled with an insulating material having a relatively low tensile strength.

One approach to this problem has been to embed the locking units in a wood frame or liner so as to provide sufficient structural strength for the locking devices. However, there are a number of disadvantages in the use of a wood frame or other wood components to provide sufficient structural strength for use in walk-in refrigerators. Wood commonly has a thermal conductivity ($k$) factor ranging from about 2.7 to 4 which is 20 to 40 times greater than the "K" factor of 0.24 for fiberglass which is used for insulating material in making panels for walk-in type refrigerators and the like. Furthermore the "K" factor of wood varies considerably with the moisture content of the wood. The higher "K" factor of wood sometimes causes loss of efficiency and "sweating" of the walk-in refrigerator panels in the region incorporating the wood due to "short circuit" transfer of heat from the outside to the inside of the refrigerator compartment via the wood. Moisture will commonly condense and collect on the panels in the region of the wood frame or other wood components under common refrigerator operating conditions (e.g., $-30°$ F.) with common ambient external temperature (e.g., $70°-90°$ F.); and this problem is particularly acute on a humid day with even a relatively high internal refrigerator temperature.

In my copending application Ser. No. 560,306, is disclosed a novel insulated panel and panel assembly structure which very satisfactorily solves the problem of support for the panel locks while, at the same time, preventing a direct through heat conductive path as provided by prior wood support structures. The present invention is directed to further embodiments and variations offering commercial alternatives of the same general type disclosed in copending application Ser. No. 560,306, filed June 24, 1966 and the disclosure of that application is incorporated herein by reference.

In the present invention, the locking structure of the panel is incorporated in an insulating laminated panel formed with inner and outer metallic shells and having a layer of rigid, highly cellular insulating material such as urethane foam, foamed in place between the shells. Because the insulating material provides little tensile support for the locking devices embedded therein, the locking units, provided in the form of relatively flat, metallic cups, are welded or otherwise attached to the ends of relatively flat metallic straps embedded in the insulation and extending from one side of the panel to the other. This construction has been found highly advantageous since the metal bands extend through the insulating walls to provide a closed metal framework and a rigid support construction which does not load the weak insulating material of the panels. Further, since the metal straps are embedded within the plastic foam insulating material, there is no thermal loss through the structural bands and/or the associated locking cups.

It is therefore one object of the present invention to provide a novel insulated panel.

Another object of the present invention is to provide a novel insulated panel particularly for use in walk-in refrigerators and other heat insulating structures.

Another object of the present invention is to provide a novel reinforcing assembly for supporting the locking elements in a heat insulating panel.

Another object of the present invention is to provide improved apparatus in the form of straps, channels, and other relatively thin flanged members for positioning and anchoring one or more locking cups adjacent the edge of an insulating panel. The supporting elements provide a closed metal framework and rigid support construction which does not load the weak insulation of the panels which is preferably formed of cellular plastic foam such as polyurethane but may be formed of other well known insulating materials such as fiber glass, polystyrene foam and the like.

These and further objects and advantages of the invention will be more apparent from reference to the following specification, claims, and appended drawings wherein:

FIGURE 1 is a perspective view of a typical walk-in refrigerator constructed in accordance with the present invention;

FIGURE 2 is a perspective view of a portion of a novel insulating panel constructed in accordance with the present invention and incorporated in the refrigerator of FIGURE 1;

FIGURE 3 is a vertical section through one of the panels of the refrigerator of FIGURE 1;

FIGURE 4 is a partial horizontal section through the panel of FIGURE 3;

FIGURE 5 is a perspective view showing a modified connector strap;

FIGURE 6 is a vertical cross section through the connector strap of FIGURE 5;

FIGURE 7 is a cross section showing a modified locking cup support;

FIGURE 8 is a cross section showing the support assembly of FIGURE 7 in plan;

FIGURE 9 is a vertical section showing the manner in which a panel is connected to the floor;

FIGURE 10 is a section showing the screed support for the locking assembly of FIGURE 9;

FIGURE 11 is a perspective view of one form of locking support structure for the panels of FIGURES 1-4;

FIGURE 12 is a plan view of the structure of FIGURE 11;

FIGURE 13 is a perspective view of a modified support assembly for the panels of FIGURES 1-4;

FIGURE 14 is a plan view of the support assembly of FIGURE 13;

FIGURE 15 is a perspective view of a further modified construction for the support assembly of the panels in FIGURES 1-4;

FIGURE 16 is a perspective view of a further modified support assembly;

FIGURE 17 is a plan view of the support assembly of FIGURE 16;

FIGURE 18 is a perspective view showing a still further modified support assembly for the panels of FIGURES 1-4; and FIGURE 19 is a plan view of the assembly shown in FIGURE 18.

Referring to the drawings, FIGURE 1 shows a typical walk-in refrigerator generally indicated at 10 of the indoor type mounted on a floor 12 adjacent walls 14 and 16 of a building. The walk-in refrigerator 10 is of the type usable in a wide variety of establishments, such as grocery stores, restaurants food wholesalers, meat packers, ice cream companies, chemical and medical institutions, as well as others. Refrigeration compartment 10 is customarily provided with one or more refrigerating units (not shown) the size and number of which depend on the inside temperature which may typically be in the neighborhood of from $-5°$ to $-40°$ F. depending upon whether the unit functions merely as a cooler at the higher temperatures or is maintained at the lower temperatures to act as a freezer. Typical interior temperature ranges for coolers are in the neighborhood of 37° to 40° F. whereas freezer units normally maintain the interior temperature of the refrigerator at some desired level below 32° F.

The walk-in unit is provided with an access or entrance door 18 and includes a plurality of heat insulating panels 20 of appropriate size and shape extending around all four sides of the walk-in. The lower edges of the panels engage floor edge caps 22 and the upper edges of the panels are similarly in heat tight sealing engagement with a plurality of ceiling edge caps 24. A ceiling (not shown) and four corner sections, such as that illustrated at 26, complete the walk-in refrigerator.

FIGURE 2 is a perspective view of a portion of one of the panels 20 which panels are rectangular and of laminated construction including a pair of spaced metallic shells 28 nad 30 between which is sandwiched a central layer or core 32 of suitable heat insulating material. In a preferred embodiment, constructed in accordance with the present invention, core 32 comprises a four inch thick layer of highly cellular and rigid urethane foam which urethane is "foamed in place" in two-pound density to have a "K" factor of approximately .118. While urethane foam is preferred for the insulating core 32, other suitable insulating materials such as fiber glass and polystyrene foam, either molded or extruded, may be used. Typical K factors for these latter materials are .26 for fiber glass, and .23 for polystyrene. Urethane foam core 32 is preferably formed with a projecting tongue such as that illustrated at 34 in FIGURE 4 along one edge 36 and with a mating groove 38 along the opposite edge 40 of the panel and also along the top and bottom edges 42 and 44 illustrated in FIGURE 3. If desired, the tongue may be provided along both a long and a short edge and a groove along the opposite long and short edges, depending upon whether or not the connecting units, such as adjacent panels and edge caps, are provided with tongues or grooves. In each instance, the mating tongue and groove connection at the juncture of two adjacent elements of the walk-in refrigerator enhance the heat sealing qualities of the structure and increase refrigerating efficiency. Shells 28 and 30 may be made of any suitable sheet metal, preferably folded over at the edges as indicated at 46 in FIGURE 4, and typical materials include aluminum, galvanized steel, and stainless steel. The surfaces of sheets made of aluminum may, if desired, be provided with a stucco pattern to minimize scratches and scuff marks so as to constantly maintain an attractive, new and pleasing appearance.

In order to attach the panels together, the insulating foam core of each panel has embedded in it, two or more flat cups 48 and 50 which cups are of similar construction and include openings or slots 52 and 54 communicating with the respective edge of the foam core 32. Each of the cups comprise a pair of flat metal plates 56 and 58, which may be stamped or otherwise folded along three edges to define flanges 60. The cups are joined along the three flat edges by spot welding the flanges together or otherwise joining them to form the flat, rectangular cup shape. Rigidly joined to the spaced side plates of the cup 50 in FIGURE 4, is a circular rod or bar 62 forming a catch which is adapted to mate and cooperate with a rotatably mounted, hook-shaped latch 64 mounted in the corresponding cup in an adjacent panel. Latch 64 is rotatably supported between the side walls 56 and 58 of the cup 48 and is rotated by means of hex rod 66 passing through a suitable aperture in the panel and side wall of the cup 48 to engage and rotate latch 64. Hex rod 66 projects outwardly from shell 30 a sufficient distance that it may be engaged by an appropriate tool and manually rotated to bring the hook or latch 64 in locking engagement with a corresponding catch such as the catch 62 in an adjacent panel as illustrated in FIGURE 4. Hex rod 66 passes through an aperture 68 in the panel and its outer end may be covered by a suitable cap or plug (not shown) after the panels have been locked together. Reference may be had to the aforementioned copending application Ser. No. 560,306 which is incoporated herein by reference for a more detailed discussion of the locking mechanism of the panels.

As mentioned above, urethane foam insulation is preferred. However, as also noted above, such material in a form suitable for insulating purposes provides a little tensile support for objects embedded therein. Thus, when locking devices joining panels are merely embedded within the insulating material itself, structural stresses are transmitted from the locking members directly to the insulating materials. This generally results in the locking receptacles becoming separated from the insulating material and, in any event, provides inadequate structural rigidity for a walk-in refrigerator. This lack of tensile strength is also evidenced by other insulating materials including fiber glass, polystyrene and the like.

Thus, in accordance with this invention, the panels include one or more horizontal metal support bands or straps such as the straps 70 illustrated in FIGURE 3. These straps are preferably spot welded at each end to the rear flange on each of the cups 48 and 50 illustrated at 72 and 74 in FIGURE 4. This construction has been found highly advantageous since the metal bands extend through the walls to provide a closed metal framework and a rigid support construction which does not load the weak insulating material of the panels. Further, since the structural elements 100 and 102 are embedded within the plastic foam insulation, there is no thermal loss across the structural straps and the associated locking cups 48 and 50. If desired, one or more vertical straps 76 may also be provided and preferably spot welded to each of the straps 70 of FIGURE 5 as at 80 and 82. Alternatively, for attachment to the ceiling and floor edge caps, the panel 20 may be provided with short flanged straps in a manner more fully described below. The vertical strap 76 is welded to the rear flanges of top cup 84 and bottom cup 86 which are similar to the cups 48 and 50 previously described. The top and bottom cups are preferably provided with latching mechanisms such as that illustrated at 64 in FIGURE 4 to cooperate with catches such as that shown at 62 in FIGURE 4 in the floor edge caps.

Elongated vertical strap 76 of FIGURE 3 is preferably completely flat and in addition to being joined to the top and bottom horizontal straps 70 may also be joined (as by welding) to the center horizontal strap. FIGURES 5 and 6 show a slightly modified construction for the straps 70 and 76 wherein the strap 110 is provided with a shallow central channel 112 to increase its strength. This construction may be used for the horizontal straps, the vertical straps, or both. In all instances the channel should be sufficiently shallow so that it is spaced by a substantial thickness of insulation from the metal shell of the panel.

FIGURES 7 and 8 show a modified panel construction which has been found useful for smaller refrigerating compartments where panel strength is not as important. In this embodiment in place of one or more of the straps 70 and 76 previously described the panel 114 is provided with a cup 116 secured by a flanged metallic bracket 118. Bracket 118 comprises a short strap 120 welded to the cup flanges and also to an angle member 122. Angle 122 is formed from a flat metal strip bent at approximately a right angle at its center where it is joined to the inner end of short strap 120. The two ends or "wings" 124 and 126 project to the sides from strap 20 as best seen in FIGURE 8 to solidly anchor the bracket 118 and cup 116 in the insulated core of panel 114.

FIGURES 9 and 10 illustrate one method of connecting the wall panels of a walk-in to a floor cap or screed provided for that purpose. In FIGURE 9 a vertical wall panel is illustrated at 128 as having embedded in its insulating core an elongated metal strap 130 having punched out integral tabs 132 along its length, preferably extending from alternate sides of the strap. These tabs serve a function similar to the "wings" 124 and 126 of FIGURE 8, that is they anchor the strap in the surrounding insulation of the panel core. Attached to the end of strap 130 is a cup 134 carrying a hook-shaped locking mechanism or latch such as that illustrated at 64 in FIGURE 4.

The floor 136 on which the walk-in is mounted is illustrated as comprising spaced layers of concrete 138 and 140 separated by a layer of insulating material 142. A screed or bottom cap of metal clad insulation is laid over the floor to define the four sides of the walk-in 10. Embedded in the screed at spaced points along its length are metal angles 146 comprising short, flat straps as illustrated in FIGURE 10 bent at a right angle to define an upwardly extending arm 148. Attached to the upper end of this arm is a cup 150 containing a catch 152 corresponding to the catch 62 of FIGURE 4. This catch is adapted to receive the hooked latch of the corresponding cup 134 embedded in the bottom of wall panel 128.

For larger walk-in constructions the edge-to-edge extending straps such as straps 70 and 76 are preferred. They have the advantage of being self-supporting during assembly and when all panels are connected together form a completely closed metal grid extending completely around the four sides of the walk-in to give it substantial strength. However, in some smaller constructions flanged straps such as bracket 118 of FIGURE 7 or the stap 130 of FIGURE 9 with projecting flanges or tabs 132 may be used. These flanged straps do not usually extend completely across the panel but rely on the flanges to anchor the locking cups along the panel edges. The wall panels are normally provided with hook containing cups along one vertical edge and catch containing cups along the opposite vertical edge so that the panel can be readily joined to adjacent similar panels. The cups along the top and bottom horizontal edges of the wall panels preferably all contain hook-type latching mechanisms adapted to engage with catches in the corresponding cups provided in the floor and ceiling caps.

FIGURES 11 and 12 show a modified cup and supporting strap or tie strap assembly for the panels 20 of FIGURES 1–4. In this embodiment, latching cup 190 is joined to a catch-containing cup 192 by a strap 194 in all respects similar to the strap 70 of the embodiment of FIGURE 4. Cup 192, as opposed to the previous embodiment, is smaller than the corresponding cup 190 and comprises a pair of flat plates 196 and 198, the latter punched out or otherwise bent over as at 200 to form a continuous flange 202, joining plate 196. The flange 202 is preferably welded to plate 196 at appropriate locations. Passing through the plates 196 and 198 and rigidly secured thereto is a metal locking pin or catch 204. Cup 190 is of similar construction but somewhat larger and comprises a pair of flat metal plates 206 and 208 with the latter similarly bent over at 210 to define a continuous flange on three sides indicated at 212 in FIGURE 11. This flange is welded or otherwise suitably joined to the flat plate 206 to form the cup 190. The two plates 206 and 208 are apertured as at 214 in FIGURE 11 to permit the hex rod 68 to pass through the cup and manually actuate the latching mechanism incorporated therein but not illustrated in FIGURES 11 and 12 for the sake of simplicity.

Again the cups and strap form a relatively flat assembly situated at or near the center of the core so as to be substantially spaced by insulation from the shells in the same manner as the assembly illustrated in FIGURES 1 through 4 so as to avoid any direct through heat conducting path from one metal shell 30 to the other metal shell 28 of the panel. The offset nature of the flanges 192 and 212 which are preferably coplanar with each other, makes it possible to connect vertical straps of various cross sections to the assembly of FIGURES 11 and 12 which do not project substantially beyond the planes of the side walls of the cups such as the planes of the side walls 206 and 208 of cup 190. That is, a vertical strap such as the strap 76 in FIGURE 3 is preferably connected to the side of the strap 194 towards the center of the panel, i.e., preferably welded to the surface 216 in FIGURE 11 so that the entire cup and strap assembly is spaced from the metal wall of the panel by at least an inch of heat insulating material and preferably more.

FIGURES 13 and 14 show a further modified tie strap and cup assembly for the insulating panels of FIGURES 1 through 4 again comprising a latching cup 218 adjoined by a metal strap 220 to a smaller catch-retaining cup 222. In this embodiment, both side walls of the two cups are folded over to define the smaller centrally located flanges 224 and 226. As before, these flanges are suitably welded together to form the cups 218 and 222. In the embodiment of FIGURES 13 and 14, the flanges 224 and 226 are only sufficiently large to form a good welding area for joining the cup plates. In this case, the strap 220 is connected to the cup walls rather than to the flanges and for this purpose the strap 220 is made of three parts, namely a long section 228 and two short strap sections 230 and 232. All three sections may be formed of flat sheet metal and bent to the appropriate configuration so as to define the spaced arms 234 and 236 at one end and the similarly spaced arms 238 and 240 at the other end of the strap. These arms are preferably spot-welded as at 242 and 244 in FIGURE 13 to each side of the respective cups or otherwise suitably adjoined to the cups approximately midway of the cups and below the locations of the aperture 214 for hex rod 66 in one cup and below the locking pin 204 of the other cup. Arms 234 and 238 are similarly welded to the main section 228 of the strap at 246 and 248 in FIGURE 14. This arrangement provides a broad area of overlap between the ends of the straps and the two cups for welding the elements together and increases the strength of the assembly since the center strap is joined on two sides to each cup.

FIGURE 15 is a perspective view of a further modified tie strap and cup assembly for the panels of FIGURES 1 through 4 in all respects similar to the modification illustrated in FIGURES 13 and 14 with the exception that the tie strap 220 has its spaced or bifurcated end portions overlying the areas through which the hex rod 66 passes into cup 218 and the locking pin 204 passes into cup 222. The ends of the strap are apertured as at 250 and 252 in FIGURE 15 to permit passage of the hex rod and locking pin through the spaced elements at each end of the tie strap whereby these elements need not be spot-welded to the spaced sidewalls of each of the cups 218 and 222 since they are anchored by the pins; they can be spot welded to the cup walls, however, if desired. With the ends of the strap 220 apertured as in FIGURE 15, the locking pin and the hex rod may be either offset or centered in the cups as desired to premit more freedom in the choice of locking mechanism supported in the cups. That is, with the rotatable latch mechanism it is often desirable to offset the latching mechanism from the center of the cup and the apertured strap makes it possible to also offset the strap location with respect to the cup center which in some instances is advantageous in further spacing the metal straps from the edge of the panel and/or making it possible to shorten the length of any vertical straps which may be incorporated in the panel.

FIGURES 16 and 17 show a further modification having increased strength and rigidity over the modifications previously described. In FIGURES 16 and 17 cups 254 and 256 which are of a construction similar to that previously described and illustrated in FIGURES 13 and 14 are joined by a pair of flat spaced tie straps 258 and 260. These straps are welded or otherwise rigidly secured at each end to the upper and lower flanged edges of the cups to provide increased strength and rigidity to the overall support and spacer assembly. This construction is advantageous for large walk-in units or in other situations where the panels must be of increased strength to withstand larger structural loads. In all the embodiments, thus far described, the straps need not be completely flat but may be embossed along their lengths or formed as angle irons if desired just so long as they are substantially spaced from the panel shells by surrounding insulation.

FIGURES 18 and 19 show still another embodiment of a cup and strap assembly for the insulating panels of FIGURES 1 through 4. In this embodiment, the cups 262 and 264 have their flanges 266 and 268 apertured as at 270 and 272 to receive the ends of a flat strap or tie bar 274. The ends 276 and 278 of tie bar 274 are passed through the apertures 270 and 272 in the cup flanges and turned over so as to rigidly join and at the same time properly space the cups within the insulating central core of a panel. The turned over ends 276 and 278 of the tie bar are sufficiently short so that no portion of the tie bar projects closely to the spaced metallic shells of the insulating panel. That is, the ends of the tie bar and cups are at all times spaced on each side by at least an inch and preferably more of heat insulating material from the metallic outer shells 28 and 30 of the panels in FIGURES 1 through 4.

The ends 276 and 278 are initially bent at a right angle and clinched with a suitable tool after passing through the cup flanges. Alternatively, the ends may be secured to the flanges by cotter pins and provided with apertures for that purpose.

It is apparent from the above that the present invention provides a novel sandwich type insulating panel construction for sectional type compartments of structural integrity, particularly suited for use in walk-in type refrigerating units used in the commercial preservation of food, medicines, chemicals and a wide variety of related products. The locking device supporting cups and structural strap assembly of the present invention makes it possible for the mass production of similar interlocking insulating panels to be used in a variety of combinations to form different size constructions conforming to specific space and size requirements. On site assembly of a strong refrigerator compartment comprising interlocked, insulating panels is expedited by the rapid and reliable locking mechanisms supported by embedded metallic straps so that locking may be simply and rapidly effected through a partial turn of the hex rod projecting from the interior edges of the assembled panels.

An important feature of the present invention is that the rapid and effective assembly is made possible through a multi-panel construction of increased strength and rigidity through the metal framework support passing through the insulating cores in the form of the metal locking cups and connected supporting metal straps. At the same time, the embedded cup and panel construction assures against heat loss and moisture with the stress being transferred through the associated straps spaced by substantial amounts of low tensile strength inculating material from the metallic side walls of each panel. Disassembly for enlargement or modification of the compartment is just as rapidly and easily effected by a quarter turn of the hex rod in the opposite direction to disengage the hook or latch from the locking pin or catch.

If desired, rubber plugs or other seals may be placed over the projecting ends of the hex rods or the hex rods may be removed and plugs inserted in the remaining holes. A simple quarter turn of the hex rod brings the locking arm or hook into tight engagement with the locking pin or catch in a corresponding cup in adjacent panels and acts to tightly seal the entire unit against heat loss and moisture with the panels tightly joined by the mating tongue-in-groove coupling illustrated and described.

While described primarily in conjunction with refrigeration it is apparent that the walk-ins may be used for maintaining warmer rather than cooler temperatures and some have been used in laboratories for that purpose.

It is apparent that various modifications and changes can be readily made in the cup and supporting strap assembly and that as many supporting straps, both horizontal and vertical, may be embedded in the insulating panels as is necessary to provide adequate structural load support. However, in all instances, the connecting straps do not extend any substantial distance beyond the planes of the vertical side walls of the spaced cups so that no heat conductive metal closely approaches the metal shells of the insulating panel which might otherwise tend to reduce the heat insulating capability of the multipanel assembly.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A heat insulating panel comprising a pair of metallic shells with a relatively thick layer of heat insulating material therebetween, a locking and supporting structure embedded in said layer and spaced from said metallic shells, said locking and supporting structure comprising a plurality of thin metallic cups each having its open end communicating with a different edge of said layer of heat insulating material, locking means supported in each of said cups, and a flanged metal strap joining each of said cups, said cups being joined by a reinforcing element bifurcated at each end and connected to opposite sides of each cup.

2. A supporting and locking structure for an insulated panel adapted for rapid assembly and disassembly comprising at least one elongated metal reinforcing element adapted to be secured within an insulating panel, a pair of quick release locking means attached adjacent to the ends of said element, comprising a catch mounted at one end of said element and a latch mounted at the opposite end of said elongated reinforcing element, said catch and latch adapted to be rapidly and releasably connected to adjacent panels in the interconnection of an array of insulating panels, said catch including a first receptacle at one end of said element with a locking pin secured therein, and said latch including a second receptacle at the other end of said element with an actuator arm pivotally supported therein, said arm having a hook-shaped end for engaging a locking pin in the catch of an adjacent panel, said receptacles being formed from a pair of flat metal sheets at least one of which is bent to form the shape of a cup, said sheets being joined by flanges along three sides of each cup, said reinforcing element being bifurcated at each end with the bifurcations joined to opposite sides of said cups.

References Cited

UNITED STATES PATENTS

| 2,741,808 | 4/1956 | Rasmussen | 52—127 |
| 2,870,625 | 1/1959 | Furer | 52—704 X |
| 2,920,475 | 1/1960 | Graham | 52—587 X |
| 3,111,787 | 11/1963 | Chamberlain | 52—309 X |
| 3,280,522 | 10/1966 | Palfey | 52—585 X |
| 3,353,314 | 11/1967 | Melcher | 52—309 |

FOREIGN PATENTS

| 224,520 | 1959 | Australia. |
| 563,849 | 1958 | Canada. |

JOHN E. MURTAGH, Primary Examiner

U.S. Cl. X.R.

52—127, 704